UNITED STATES PATENT OFFICE.

RUDOLF SOMMER, OF VIENNA, AUSTRIA-HUNGARY.

PROCESS OF MAKING ORGANIC-ACID ANHYDRIDS.

No. 806,932. Specification of Letters Patent. Patented Dec. 12, 1905.

Application filed June 22, 1905. Serial No. 266,400. (Specimens.)

*To all whom it may concern:*

Be it known that I, RUDOLF SOMMER, chemist, a subject of the Emperor of Austria-Hungary, residing at Währingerstrasse 59, Vienna, IX, in the Empire of Austria-Hungary, have invented new and useful Improvements in Organic-Acid Anhydrids and Process of Making Same; and I do hereby declare the following to be a full, clear, and exact description of the invention, such as will enable others skilled in the art to which it appertains to make and use the same.

This invention relates to the production of anhydrids of the organic acids.

The methods hitherto adopted for producing organic-acid anhydrids are as follows: (*a*) by the action of acids or acid salts on acid chlorids, (*b*) by the reaction of phosphoric pentoxid upon the acids, (*c*) by passing phosgene or bisulfid of carbon over the heated salt, (*d*) by the reaction between sulfuryl chlorid and salts of the acids, (*e*) by the action of chlorin dioxid and sulfur-dioxid gas upon the salts, (*f*) by the treatment of the salts with aromatic sulfo-acid chlorids, and (*g*) by sulfur chlorid.

According to my invention I transform the acids into their anhydrids by acting upon the heated dehydrated salts of the acids with tetrafluorid of silicon. I have found that by the employment of this substance, which is of low cost and easily obtainable, I am enabled to produce anhydrids with facility. I have also found that tetrafluorid is yielded from the residue obtained on the distillation of the anhydrids by treating it with sulfuric acid with the addition of some sand.

The following examples will enable the invention to be fully understood:

1. Tetrafluorid, obtained, for example, by heating two parts of fluor-spar and two parts of sand with two parts of concentrated sulfuric acid, is first treated with a heated mixture of sand and sulfuric acid and is then passed into one part of dehydrated sodium acetate heated to a temperature of about 200° to 220° centigrade. The gas is quickly absorbed, and as soon as the absorption is complete the anhydrid which is formed commences to distil over. The unused gas is conveyed into a second and then into a third absorption vessel. The acetic-acid anhydrid, which is formed approximately quantitatively, practically all passes over with the first distillate at about 138° centigrade.

2. Two parts of the residue of distillation obtained in the previous example are heated with one part of sand and two parts of concentrated sulfuric acid, and the gas which is generated after being dried is conveyed into potassium benzonate heated to about 200° centigrade. When no further absorption takes place, extraction with benzin is effected. The crystals, which melt at 42° centigrade, consist of pure anhydrid.

What I claim as my invention, and desire to secure by Letters Patent, is—

1. The method of producing acid anhydrid from dehydrated salts of the acids, consisting in subjecting a dehydrated salt to the action of tetrafluorid of silicon.

2. The method of producing acid anhydrid from sodium acetate, consisting in subjecting heated sodium acetate to the action of tetrafluorid of silicon.

3. The method of producing acid anhydrid from dehydrated salts of the acids, consisting in treating tetrafluorid of silicon with a heated mixture of sand and sulfuric acid, and then passing the tetrafluorid of silicon into a dehydrated salt.

4. In the production of anhydrid from dehydrated salts of the acids, the steps consisting in subjecting heated dehydrated salt to the action of tetrafluorid of silicon, heating the residue of such distillation with sand and sulfuric acid, drying the gas generated, conveying the dried gas into a heated benzoic-acid salt, and extracting with benzin.

5. In the production of anhydrid from dehydrated salts of the acids, the steps consisting in subjecting heated dehydrated salt to the action of tetrafluorid of silicon and heating the residue of such distillation with sand and sulfuric acid to recover tetrafluorid of silicon therefrom.

In testimony whereof I have signed my name to this specification in the presence of two subscribing witnesses.

RUDOLF SOMMER.

Witnesses:
 WENZEL LINKE FREY,
 ALVESTO S. HOGUE.